United States Patent
Fukuda et al.

(10) Patent No.: US 8,069,274 B2
(45) Date of Patent: Nov. 29, 2011

(54) SYSTEM AND METHOD FOR SERIAL DATA COMMUNICATIONS BETWEEN HOST AND COMMUNICATIONS DEVICES, AND COMMUNICATIONS DEVICE EMPLOYED IN THE SYSTEM AND METHOD

(75) Inventors: Yohsuke Fukuda, Ikeda (JP); Kazuhiko Hara, Sanda (JP)

(73) Assignee: Ricoh Company, Ltd., Tokyo (JP)

( * ) Notice: Subject to any disclaimer, the term of this patent is extended or adjusted under 35 U.S.C. 154(b) by 185 days.

(21) Appl. No.: 12/510,390

(22) Filed: Jul. 28, 2009

(65) Prior Publication Data

US 2010/0023657 A1    Jan. 28, 2010

(30) Foreign Application Priority Data

Jul. 28, 2008 (JP) ................................. 2008-193134
Jul. 23, 2009 (JP) ................................. 2009-172252

(51) Int. Cl.
*G06F 3/00* (2006.01)
*G06F 13/00* (2006.01)

(52) U.S. Cl. ................ 710/8; 710/5; 710/15; 710/19; 710/33

(58) Field of Classification Search ................. None
See application file for complete search history.

(56) References Cited

U.S. PATENT DOCUMENTS

| 6,212,171 B1 * | 4/2001 | LaFollette et al. | 370/257 |
| 2006/0282722 A1 * | 12/2006 | Co et al. | 714/724 |
| 2009/0138570 A1 * | 5/2009 | Miura et al. | 709/217 |

FOREIGN PATENT DOCUMENTS

| JP | 2004-289857 A | 10/2004 |
| JP | 2005-228222 A | 8/2005 |
| JP | 2007-226737 A | 9/2007 |
| JP | 2008-003913 A | 1/2008 |
| JP | 2008-071250 A | 3/2008 |
| JP | 2008-191788 A | 8/2008 |

OTHER PUBLICATIONS

Moon et al, An Area Efficient 2GB/s 256 MB packet-based DRAM with daisy chained redundancy scheme, 2001, Samsung Electronics, Ieeexplore.org [online, accessed on Mar. 27, 2011], URL: http://ieeexplore.ieee.org/stamp/stamp.jsp?tp=&arnumber=934187.*

* cited by examiner

*Primary Examiner* — Tariq Hafiz
*Assistant Examiner* — Scott Sun
(74) *Attorney, Agent, or Firm* — Dickstein Shapiro LLP (57) ABSTRACT

A communications device includes a communications circuit, a memory, an identifier generator, and a latency controller. The communications circuit exchanges serial data with a host computer and a downstream device, and includes a first input, a first output, a second input, and a second output. The first input receives data from the host computer. The first output transmits data to the host computer. The second input receives data from the downstream device. The second output transmits data to the downstream device. The memory is accessible through the communications circuit. The identifier generator generates an identifier number unique to the communications device in response to an identifier setup request received at the first input. The latency controller determines, based on the generated identifier number, a period of latency required to access the memory through the communications circuit.

20 Claims, 9 Drawing Sheets

SYSTEM AND METHOD FOR SERIAL DATA COMMUNICATIONS BETWEEN HOST AND COMMUNICATIONS DEVICES, AND COMMUNICATIONS DEVICE EMPLOYED IN THE SYSTEM AND METHOD

CROSS-REFERENCE TO RELATED APPLICATIONS

This application claims priority from Japanese Patent Application Nos. 2008-193134 and 2009-172252, filed on Jul. 28, 2008 and Jul. 23, 2009, respectively, in the Japanese Patent Office, which are hereby incorporated by reference herein in their entirety.

FIELD OF THE INVENTION

The present invention relates to a system and method for serial data communications between host and communications devices, and more particularly, to a communications device that exchanges data with a host computer over a serial bus, and serial data communications system and method incorporating such a communications device.

BACKGROUND OF THE INVENTION

In data communications, multiple communications devices exchange data through a communications interface, such as a parallel bus transmitting bits of data simultaneously along multiple data channels, and a serial bus transmitting data bit by bit sequentially over a single data channel. Modern communications equipment can be wired using both parallel and serial buses in various network architectures such as daisy chain and multi-drop basic topologies, or hybrid topologies combining characteristics of the basic topologies.

In a simple communications system, in which a host computer communicates data with multiple communications devices, serial buses are often used rather than parallel buses. Part of the reason for this is that a serial interface uses a smaller number of input/output terminals, and hence requires less packaging costs than a parallel one, and that in general, a serial bus can transmit data at a higher transfer rate than a parallel bus, thus meeting high-speed requirements for today's broadband network communications.

Currently, communications products with multiple serial data channels per interface are commercially available at relatively low cost. The multi-channel design enables serial data communications at a data transfer rate higher than that possible with a single data channel per interface, with one channel dedicated to reception from a data source and another to transmission to a data destination. Along with such high performance devices coming into common use, a greater need arises for ensuring proper data transfer in serial data communications at even higher data transfer rates, and consequently various methods have been proposed to provide high-speed, reliable serial data communications systems.

For example, one conventional method provides a communications system in which a host device communicates serial data to multiple peripheral devices connected in series to form a daisy chain network. According to this method, each peripheral device incorporates a processor to perform data transfer with upstream and downstream devices individually, enabling two interconnected nodes of the communications system to perform data transmission independently of the other nodes.

Designed to overcome problems encountered when a single host controls a daisy chain of multiple devices by providing short pulse "strobe" signals indicating when to capture data from a data line, this conventional technique eliminates the need for transmitting dedicated strobe signals to the multiple daisy-chained devices, resulting in reduced amounts of time and load required for the host device to access the peripheral devices. Such an effect is significant particularly where the system includes a large number of peripheral devices, requiring a greater number of strobe drivers, and a longer distance over which the host transmits data to the endmost node along the daisy chain.

Another conventional method provides a communications system in which a master device supplies data and clock signals to a daisy chain of multiple slave devices each equipped with a buffer circuit for receiving the supplied signals. According to this method, the buffer circuit captures data and clock signals to output synchronized data into the slave device, so that each slave device can correctly process the incoming data with the external clock signal even at higher data transfer rates.

Besides these conventional methods, several methods provide reliable data communications using a clock or strobe signal embedded in a data signal based on an encoding scheme, such as data strobe encoding, called DS-link, specified in IEEE 1394 or Institute of Electrical and Electronics Engineers high speed serial bus standard, or 8B/10B encoding used by Peripheral Component Interconnect Express (PCIe). Using embedded clocking to eliminate problems with skew between data and timing signals, these methods provide good synchronization between multiple communications devices, thereby enabling reliable high-speed data transfer in serial data communications systems.

Figure 1:
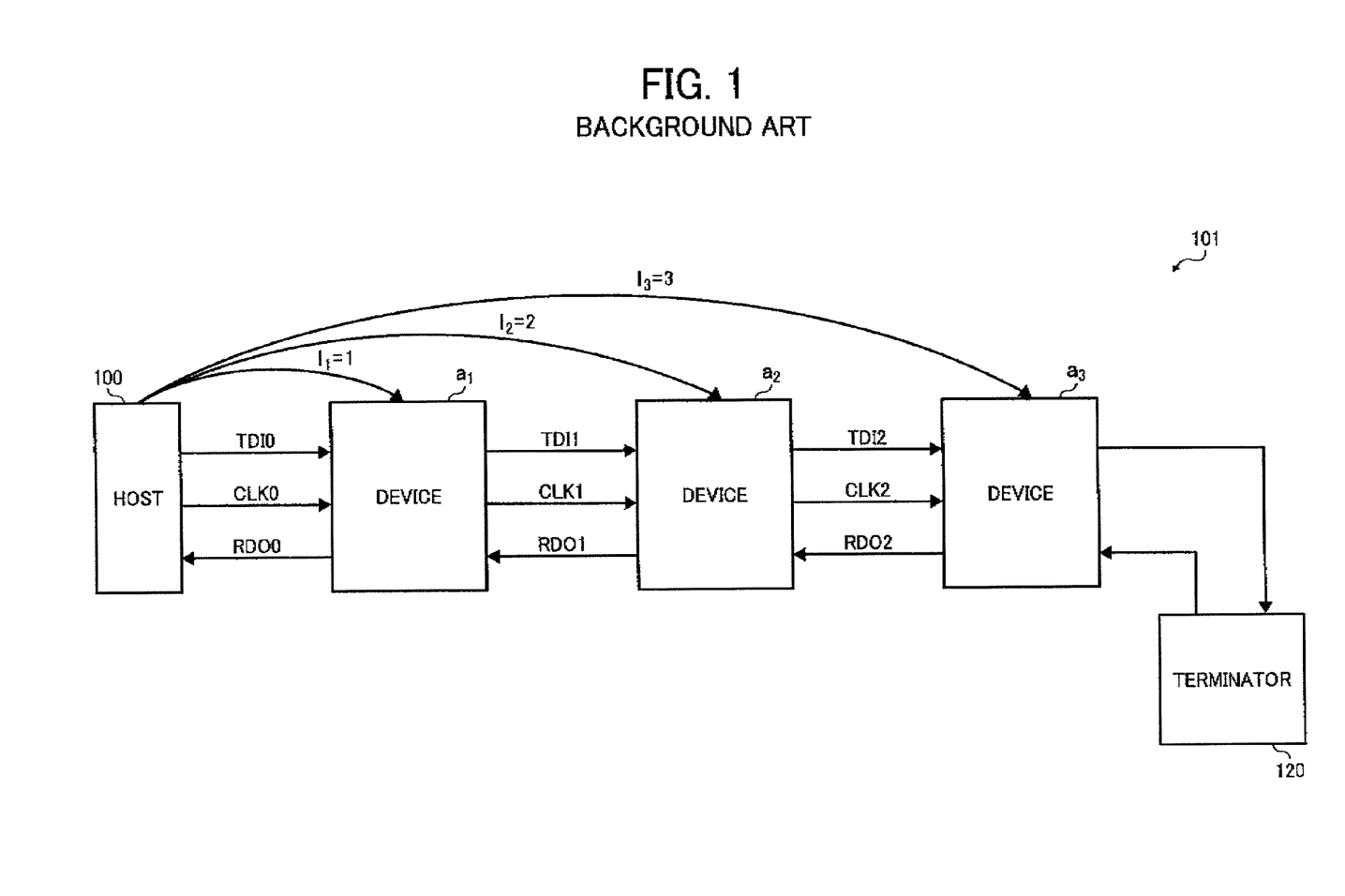
FIG. 1 is a block diagram schematically illustrating a conventional serial data communications system having a daisy chain topology.

FIG. 1 is a block diagram schematically illustrating a conventional serial data communications system 101 having a daisy chain topology.

As shown in FIG. 1, the communications system 101 includes a host computer 100 and multiple devices $a_1$, $a_2$, and $a_3$ connected in series via a serial bus to form a daisy chain network, with the host computer 100 directly wired to the first device $a_1$, the first device $a_1$ to the second device $a_2$, the second device $a_2$ to the third device $a_3$, and the third device $a_3$ attached to a terminator 120 farthest from the host computer 100.

In the communications system 101, the host computer 100 connects to the first device $a_1$ via a pair of data channels TDI0 and RDO0, one for transmission and the other for reception, as well as a clock channel CLK0 for providing a primary clock signal. Similarly, the first device $a_1$ connects to the second device $a_2$ via a pair of data channels TDI1 and RDO1, one for transmission and the other for reception, as well as a clock channel CLK1 for providing a buffered secondary clock signal, and the second device $a_2$ connects to the third device $a_3$ via a pair of data channels TDI21 and RDO21, one for transmission and the other for reception, as well as a clock channel CLK2 for providing a buffered tertiary clock signal. Each device has an internal processor that processes data input from the transmission channel TDI with the accompanying clock signal CLK for storage to an internal memory, and retrieves data from the internal memory for output to the reception line RDO0.

During operation, the host computer 100 submits a request for writing data to the multiple devices on the daisy chain, which travels along the transmission line TDI to propagate from one device to another sequentially throughout the communications system 101. Upon receiving the write request TDI0 from the host 100, the first device $a_1$ retains the incoming data for processing in the internal processor before sending it to the downstream transmission channel TDI1 as well as to the internal memory, resulting in a period of delay longer than one cycle of the clock input CLK0 in executing and forwarding the write request TDI0 at the input stage. Similarly, the second device $a_2$ involves an input delay of some cycles of the clock signal CLK1 in executing and forwarding the input request TDI1, and the third device $a_3$ involves an input delay of some cycles of the clock signal CLK2 before executing and forwarding the input request TDI2.

Also, when the host computer 100 submits a request for reading data from the multiple devices on the daisy chain, each device retains desired data retrieved from the internal memory before sending it to the upstream reception channel RDO. As in the case of the writing operation, the result is that each device causes a period of output delay longer than one cycle of the clock input CLK in executing and forwarding the read request TDI at the output stage.

Naturally, such a processing delay is compounded as the transmitted data passes through an increasing number of interposed devices, resulting in varying amounts of latency (i.e., accumulated delay between when the host 100 submits a request to the transmission line TDI and when each device actually executes a requested service) for the multiple daisy-chained communications devices.

For example, given that each device requires an input delay of one clock cycle, the latency between the host 100 submitting a write request and each device actually writing the transmitted data to the internal memory increases depending on the relative positions of the host 100 and the particular device in the daisy chain network, measuring 1 clock cycle for the first device $a_1$, 2 clock cycles for the second device $a_2$, and 3 clock cycles for the third device $a_3$.

Occasionally, the host computer 100 is required to time the execution of a read/write operation of each communication device to coordinate the overall operation of the communications system 101, for example, when the multiple devices perform a certain task in concert with each other. In such cases, the host computer 100 should transmit a read/write request to each particular device at a different time determined by the amount of latency that is inherent in the target device. However, determining a proper time at which to transmit a read/write request is difficult, since, as noted above, the amount of latency varies among the multiple daisy-chained devices, and each device typically has different amounts of latency for read and write operations.

One approach to cope with such variations in processing latency is to provide a strobe signal indicating to each communications device when to capture transmitted data, whereby the host can calculate the amount of inherent latency and determine the proper timing for request transmission accordingly. However, this approach is impractical considering that adding strobe channels dedicated to multiple devices results in higher costs and reduced data transfer rates of the communications system. Moreover, as for the conventional communications systems described above, unfortunately neither of them provides an effective solution to control the amount of latency for multiple communications devices in a daisy chain network.

SUMMARY OF THE INVENTION

This patent specification describes a novel communications device system and method, and more particularly a communications device employed in the system and method.

In one embodiment, the novel communications device includes a communications circuit, a memory, an identifier generator, and a latency controller. The communications circuit exchanges serial data with a host computer and a downstream device; and includes a first input, a first output, a second input, and a second output. The first input receives data from the host computer. The first output transmits data to the host computer. The second input receives data from the downstream device. The second output transmits data to the downstream device. The memory is accessible through the communications circuit. The identifier generator generates an identifier number unique to the communications device in response to an identifier setup request received at the first input. The latency controller determines, based on the generated identifier number, a period of latency required to access the memory through the communications circuit.

This patent specification also describes a novel data communications system.

In one embodiment, the data communications system includes multiple communications devices and a host computer. The multiple communications devices are connected in series to form a daisy chain network. The host computer communicates data with the multiple communications devices over the daisy chain network. Each communications device includes a communications circuit, a memory, an identifier generator, and a latency controller. The communications circuit exchanges serial data with a host computer and a downstream device, and includes a first input, a first output, a second input, and a second output. The first input receives data from the host computer. The first output transmits data to the host computer. The second input receives data from the downstream device. The second output transmits data to the downstream device. The memory is accessible through the communications circuit. The identifier generator generates an identifier number unique to the communications device in response to an identifier setup request received at the first input. The latency controller determines, based on the generated identifier number, a period of latency required to access the memory through the communications circuit.

This patent specification further describes a novel data communications method for data communications between a host computer and multiple communications devices.

In one embodiment, each communications device includes a communications circuit and a memory. The communications circuit exchanges serial data with the host computer and a downstream device, and includes a first input, a first output, a second input, and a second output. The first input receives data from the host computer. The first output transmits data to the host computer. The second input receives data from the downstream device. The second output transmits data to the downstream device. The memory is accessible through the communications circuit. The communications method includes request provision, identifier generation, and latency determination. The request provision provides an identifier setup request to the first input of each communications device. The identifier generation generates an identifier number unique to each communications device from the identifier setup request. The latency determination determines, based on the generated identifier number, a period of latency required to access the memory through the communications circuit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, example embodiments of this patent specification are described.

Figure 2:
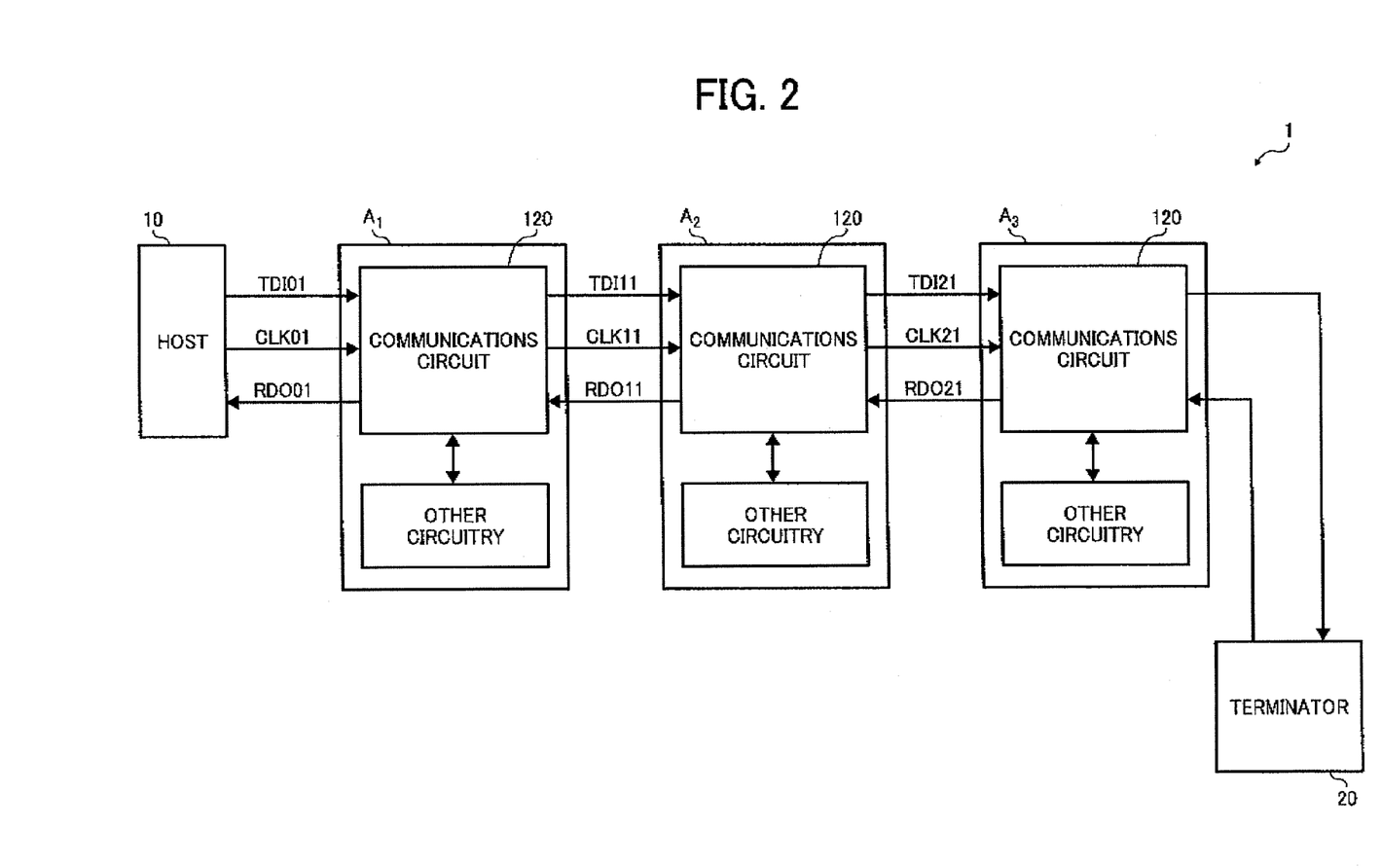
FIG. 2 is a block diagram schematically illustrating a communications system according to one embodiment of this patent specification.

FIG. 2 is a block diagram schematically illustrating a communications system 1 according to one embodiment of this patent specification.

As shown in FIG. 2, the communications system 1 includes a host computer 10 and multiple communications devices $A_1$, $A_2$, and $A_3$ connected in series via a serial interface or bus to form a daisy chain network, in which the host computer 10 is directly wired to the first device $A_1$, the first device $A_1$ to the second device $A_2$, the second device $A_2$ to the third device $A_3$, and the third device $A_3$ attached to a terminator 20 farthest from the host computer 10. Referred to collectively, herein the communications devices are simply "the communications devices A".

In the communications system 1, the host computer 10 connects to the first device $A_1$ via a pair of data channels TDI01 and RDO01, one for transmission and the other for reception, as well as a clock channel CLK01 for providing a primary clock signal. Similarly, the first device $A_1$ connects to the second device $A_2$ via a pair of data channels TDI11 and RDO11, one for transmission and the other for reception, as well as a clock channel CLK11 for providing a secondary clock signal. Also, the second device $A_2$ connects to the third device $A_3$ via a pair of data channels TDI21 and RDO21, one for transmission and the other for reception, as well as a clock channel CLK21 for providing a tertiary clock signal. As will be described later in more detail, the communications devices $A_1$, $A_2$, and $A_3$ include circuitry of a substantially identical configuration, each incorporating a communications circuit 120 connected to external devices as well as to internal circuit elements, such as a register, a memory, a central processing unit (CPU) core, etc.

In the following discussion, the alphanumeric references assigned to the lines in drawings, such as TDI01, CLK01, RDO01, etc., can designate both signal channels and signals transmitted through the associated channels, and the signals on the data channels TDI and RDO each represents a piece of information formatted in a serial communications protocol. The terms "upstream" and "downstream" as used herein refer to a direction of data flowing between the host computer 10 and the communications devices A, and also describes relative positions in the daisy chain network, for example, the first device $A_1$ is immediately downstream from the host computer 10 and upstream from the second device $A_2$, the second device $A_2$ is immediately downstream from the first device $A_1$ and upstream from the third device $A_3$, and so forth.

During operation, the host computer 10 and the communications devices A exchange information over the serial bus, in which data flows bit by bit downstream from the host computer 10 to the communications devices A through the transmission line TDI, and upstream from the communications devices A to the host computer 10 through the reception line RDO.

Specifically, the host computer 10 submits write and read requests to the transmission line TDI for writing and reading data to and from the communications devices A together with a clock signal CLK for synchronizing operation of the communications system 1. Upon receiving a write request, the communications device A stores the incoming data to the internal memory while forwarding the write request downstream to the transmission channel TDI. In response to a read request, the communications device A retrieves desired data from the internal memory while forwarding the write request downstream to the transmission channel TDI, and outputs the retrieved data upstream to the reception channel RDO. Thus, in the communications system 1, a request submitted by the host computer 10 propagates to each of the communications devices A through the transmission line TDI, and read data output from each of the communications devices A propagates to the host computer 10 through the reception line RDO.

Figure 3:
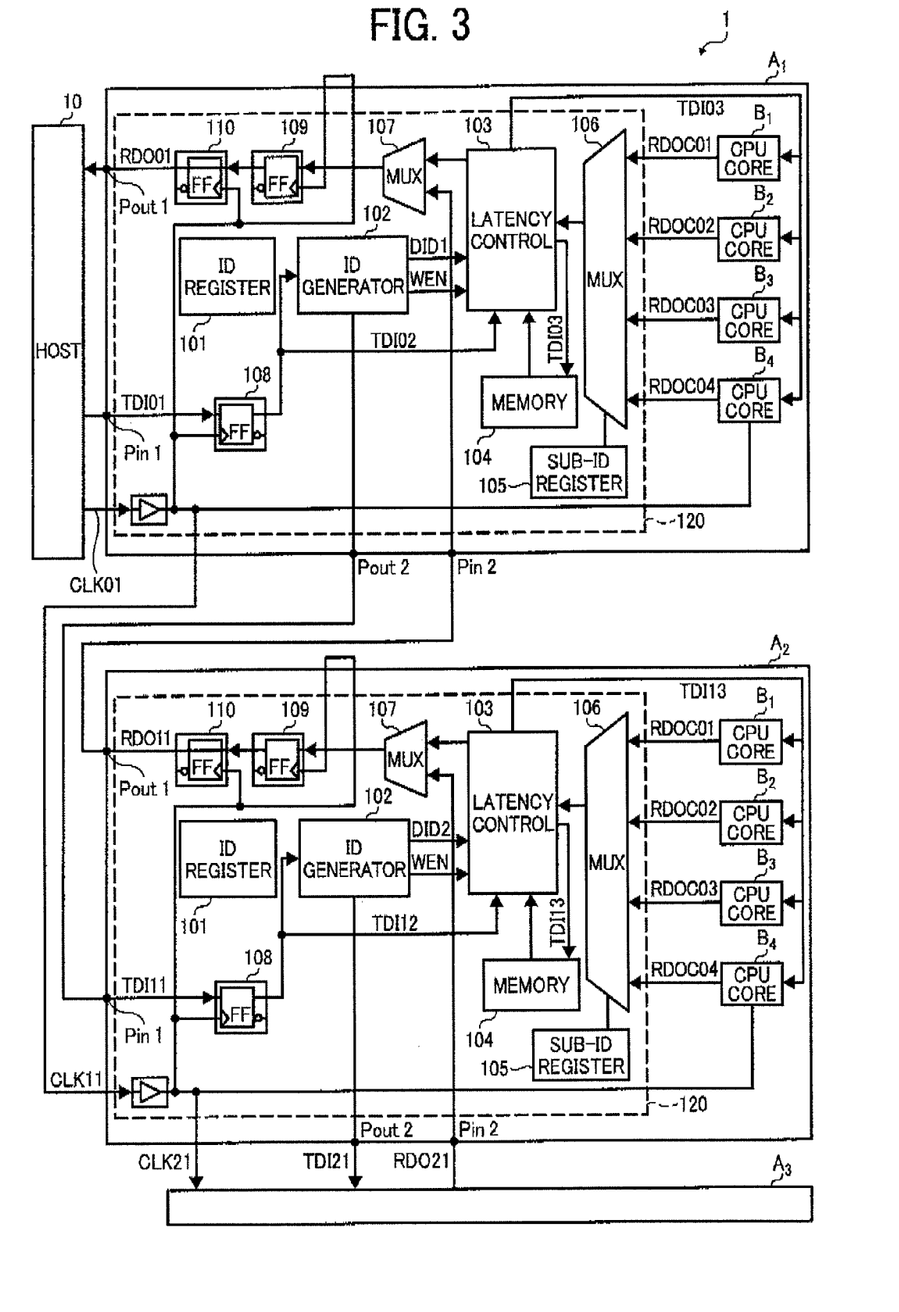
FIG. 3 is a circuit diagram illustrating in detail internal circuitry of a communications device incorporated in the communications system of FIG. 2.

FIG. 3 is a circuit diagram illustrating in detail internal circuitry of the communications device A incorporated in the communications system 1 according to this patent specification.

As mentioned, the communications system 1 use multiple communications devices A substantially identical to each other in basic configuration, particularly in what relates to the communications circuit 120. Hence, the following description focuses primarily on the configuration of the first device $A_1$ immediately downstream of the host computer 10, which will suffice as a general description of the communications devices A incorporated in the communications system 1 according to this patent specification.

As shown in FIG. 3, the communications device $A_1$ has a first input Pin1 to receive data TID01 from the host computer 10, a first output Pout1 to transmit data RDO01 to the host computer 10, a second input Pin2 to receive data RDO11 from the second device $A_2$, and a second output Pout2 to transmit data TDI11 to the second device $A_2$, all coupled to the communications circuit 120 formed of an identifier register 101, an identifier generator 102, a latency controller 103, a memory 104, a sub-identifier register 105, first and second multiplexers (MUX) 106 and 107, an input flip-flop 108, and a series of output flip-flops 109 and 110. The communications device $A_1$ also includes multiple CPU cores $B_1$ through $B_4$ connected to the communications circuit 120 via data channels RDOC01, RDOC02, RDOC03, RDOC04, respectively, and a common data channel TDI03. For simplicity, FIG. 3 omits several signal channels interconnecting elements of the communications circuit 120, for example, one connecting the clock channel CLK01 to the latency controller 103, one connecting the ID register 101 to the first input Pin1, one connecting the ID register 101 to the ID generator 102, etc. The following describes transmission of signals between such components assuming them to be connected to each other via suitable wiring not shown in the drawing.

In the communications device $A_1$, the communications circuit 120 controls data communications between internal memory and external devices on the communications system 1, through which the host computer 10 can access (i.e., read and write data to and from) the memory 104 and the CPU cores $B_1$ through $B_4$ internal to the communications device $A_1$. The memory 104 includes various types of registers and other storage devices contained in the communications circuit 120, and the CPU cores $B_1$ through $B_4$ are independent modules contained in the communications device $A_1$, each including a memory for storing programs and data, a sequencer, a processor, and various types of internal registers.

During operation, the host computer 10 transmits a data signal TDI01 and a clock signal CLK01. Received at the first input Pin of the communications device $A_1$, the data signal TDI01 initially enters the input flip-flop 108 accompanied by the clock signal CLK01.

The input flip-flop 108 samples the data signal TDI01 at the rising edge of the clock signal CLK01 to output a delayed data signal TDI02 to the ID generator 102 and to the latency controller 103, respectively.

The ID generator 102 analyzes the output of the flip-flop 103 to determine what operation is to be performed in response to the data signal TDI02. When the signal TDI02 is an identifier setup request, the ID generator 102 accordingly generates an identifier number $I_1$ unique to the first communications device $A_1$, provides an identifier signal DID1 to the latency controller 103, and outputs a secondary data signal TDI11 to the second output Pout2 for transmission to the second communications device $A_2$.

Also, the ID generator 102 compares the generated identifier $I_1$ with a reference value held in the ID register 101, which can be rewritten by the host computer 10 through the data channel TDI01 as required. According to the comparison results, the ID generator 102 outputs a write/read enable signal WEN to the latency controller 103, which enables or disables data delivery to and from the memory 104 and the CPU cores $B_1$ through $B_4$ depending on whether the identifier number $I_1$ matches the registered reference value.

Upon receiving the data signal TDI02, the latency controller 103 samples the incoming data with the clock signal CLK01 to output an additionally delayed data signal TDI03 to a specified memory location (i.e., to one or more of the memory 104 and the CPU cores $B_1$ through $B_4$) according to the control signals DID1 and WEN. Further, upon receiving read data from the internal memory, the latency controller 103 samples the incoming data with the clock signal CLK01 to output a delayed data signal to the MUX 107 according to the control signals DID1 and WEN.

Specifically, when the signal TDI02 is a write request containing data to be written and the write/read enable signal WEN is on, the latency controller 103 retains the incoming signal TDI02 for an additional input latency of one or more clock cycles according to the identifier signal DID, and stores the data signal TDI03 to the specified memory location upon elapse of the additional input latency. When the signal TDI02 is a read request indicating data to be read and the write/read enable signal WEN is on, the latency controller 103 retains the incoming signal TDI02 for an additional input latency of one or more clock cycles according to the identifier signal DID, retrieves data from the specified memory location upon elapse of the additional input latency, and then retains the retrieved data for an additional output latency of one or more clock cycles according to the identifier signal DID.

In case of reading data from the CPU cores $B_1$ through $B_4$, the first MUX 106 serves to selectively forward the read data RDOC from the CPU cores $B_1$ through $B_4$ to the latency controller 103 according to the sub-ID register 105. The sub-ID register 105 holds a reference value for comparison with sub-identifier numbers assigned to the CPU cores $B_1$ through $B_4$, which can be rewritten by the host computer 10 through the data channel TDI01 as required. The sub-ID register 105 determines which CPU core is to be accessed depending on whether the reference value matches the sub-identifier number, and accordingly outputs a control signal to the first MUX 106.

The second MUX 107 selectively forwards the output of the latency controller 103 or a data signal RDO11 from the second communications device $A_2$ to the series of output flip-flops 109 and 110, which serve to adjust timing in outputting data RDO01 to the first output Pout1 for transmission to the host computer 10.

In such a configuration, processing data in response to a read/write request from the host computer 10 causes a delay of one or more clock cycles in the communications device A, where the input flip-flop 108 and the output flip-flops 109 and 110 operate as pipeline registers in the daisy chain network. Such a processing delay is compounded as the transmitted data passes through an increasing number of interposed devices A, resulting in varying amounts of inherent latency (i.e., accumulated delay between when the host computer 10 submits a request to the transmission line TDI and when each device A actually executes a requested service) for the multiple daisy-chained devices A in the communications system 1.

According to this patent specification, the communications device A can control the amount of latency with which the host computer 10 accesses the internal memory of the communications circuit 120, wherein the latency controller 103 retains a write/read request TDI02 for an additional input latency before outputting a delayed write/read request TDI03 to the memory at the input stage, and retains data read from the memory for an additional output latency before outputting the delayed read data to the upstream reception line RDO at the output stage. The amount of additional latency is determined based on the identifier number I dynamically generated by the ID generator 102, which enables the latency controller 103 to operate according to the position of the communications device A relative to the host computer 10 in the daisy chain network. Moreover, the communications device A allows the host computer 10 to selectively access a particular memory location based on a unique sub-identifier number assigned to each of the CPU cores $B_1$ through $B_4$.

Figure 4:
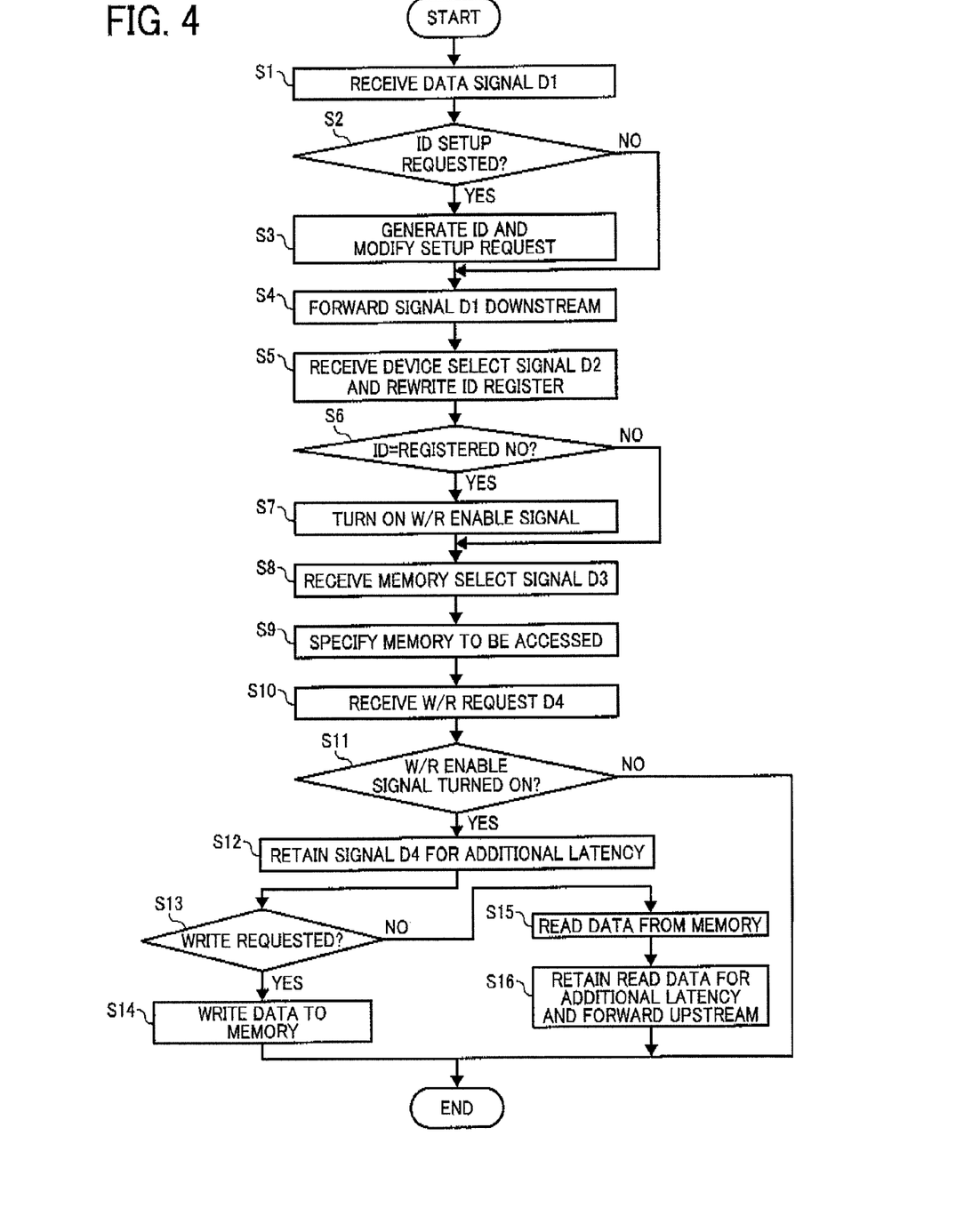
FIG. 4 is a flowchart illustrating the operation of the communications device of FIG. 3.

FIG. 4 is a flowchart illustrating the operation of the communications device A according to one embodiment of this patent specification, in which the host computer 10 provides the communications device A with request signals D1 through D4 formatted according to a serial communications protocol, each containing a series of 22 bits, with the first 5 bits indicating an address of the data contents, the subsequent 1 bit for selecting an operation mode, and the last 16 bits containing data, if any, to be written to the addressed memory location.

Initially, the communications device A receives a data signal D1 from the host computer 10. In the communications circuit 120, the received signal D1 is sampled by the input flip-flop 108 with an accompanying clock signal CLK, and then is forwarded to the ID generator 102. The ID generator 102 analyzes the 5-bit address of the incoming signal D1 to determine what operation is to be performed, while simultaneously outputting the analyzed address bits to the second output Pout2 for forwarding to a downstream device (step S1).

When the address bits represent a value indicating the incoming signal D1 is a request to set up an identifier number ("YES" in step S2), the ID generator 102 records the 16-bit binary data contained in the ID setup request D1, decodes it to generate a decimal identifier number I, and modifies the data bits by a predetermined procedure (step S3), followed by forwarding the modified data bits of the signal D1 to the downstream device (step S4).

When the address bits indicate the incoming signal D1 is not an ID setup request ("NO" in step S2), the ID generator 102 forwards the data signal D1 without modification to the downstream device (step S4).

Subsequently, the communications device A receives a device select signal D2 from the host computer 10 indicating a request to write a reference value to the ID register 101. Upon receiving the device select signal D2, the communications circuit 120 rewrites the ID register 101 accordingly, and forwards the signal D2 to the downstream device, resulting in every communications device A holding the common reference value in the ID register 101 (step S5). With the ID register 101 thus being rewritten, the ID generator 102 compares the unique identifier against the reference value to determine whether or not to enable data delivery to and from the internal memory.

When the unique identifier matches the reference value ("YES" in step S6), the ID generator 102 turns on the write/read enable signal WEN, which enables the memory 104 and the CPU cores $B_1$ through $B_4$ to deliver data to and from the latency controller 103 (step S7). When the unique identifier does not match the reference value ("NO" in step S6), the write/read enable signal WEN remains off, disabling the internal memory from delivering data to and from the latency controller 103.

Optionally, the communications device A may receive a memory select signal D3 from the host computer 10 indicating a request to write a reference value to the sub-ID register 105. Upon receiving the memory select signal D3, the communications circuit 120 rewrites the sub-ID register 105 accordingly (step S8), thereby specifying which one of the multiple CPU cores B and the memory 104 to be accessed by the host computer 10 in a subsequent write/read operation (step S9).

For example, with the CPU cores $B_1$, $B_2$, $B_3$, and $B_4$ assigned sub-ID numbers "2", "3", "4", and "5", respectively, the core select signal S3 can specify one of the CPU cores B by writing the corresponding sub-ID number to the sub-ID register 105, and all the CPU cores B by writing "0" to the sub-ID register 105. In such cases, to specify the memory 104 instead of the CPU cores B, the sub-ID register 105 may be written to a value other than the assigned sub-ID numbers.

Thereafter, the communications device A receives a write/read request signal D4 from the host computer 10 indicating a request to write or read data to or from the internal memory (step S10), which is forwarded to the latency controller 103 only where the enable signal WEN has been turned on.

When the enable signal WEN remains off ("NO" in step S11), the operation completes without reading or writing data to or from the internal memory. When the enable signal WEN is on ("YES" in step S11), the latency controller 103 retains the incoming signal D4 for an additional input latency determined according to the identifier number I (step S12), and subsequently analyzes the address bits of the signal D4 to determine the memory location for which the write/read request is destined, while checking the mode selection bit to determine whether the requested operation is write or read.

When a write operation is requested ("YES" in step S13), the latency controller 103 stores the 16-bits data to the specified memory location upon elapse of the additional input latency (step S14), thereby completing the write operation.

When a read operation is requested ("NO" in step S13), the latency controller 103 retrieves data from the specified memory location upon elapse of the additional input latency (step S15). Further, the latency controller 103 retains the retrieved data for an additional output latency determined according to the identifier number I, and forwards it to the upstream device upon elapse of the additional output latency (step S16), thereby completing the read operation.

Figure 5:
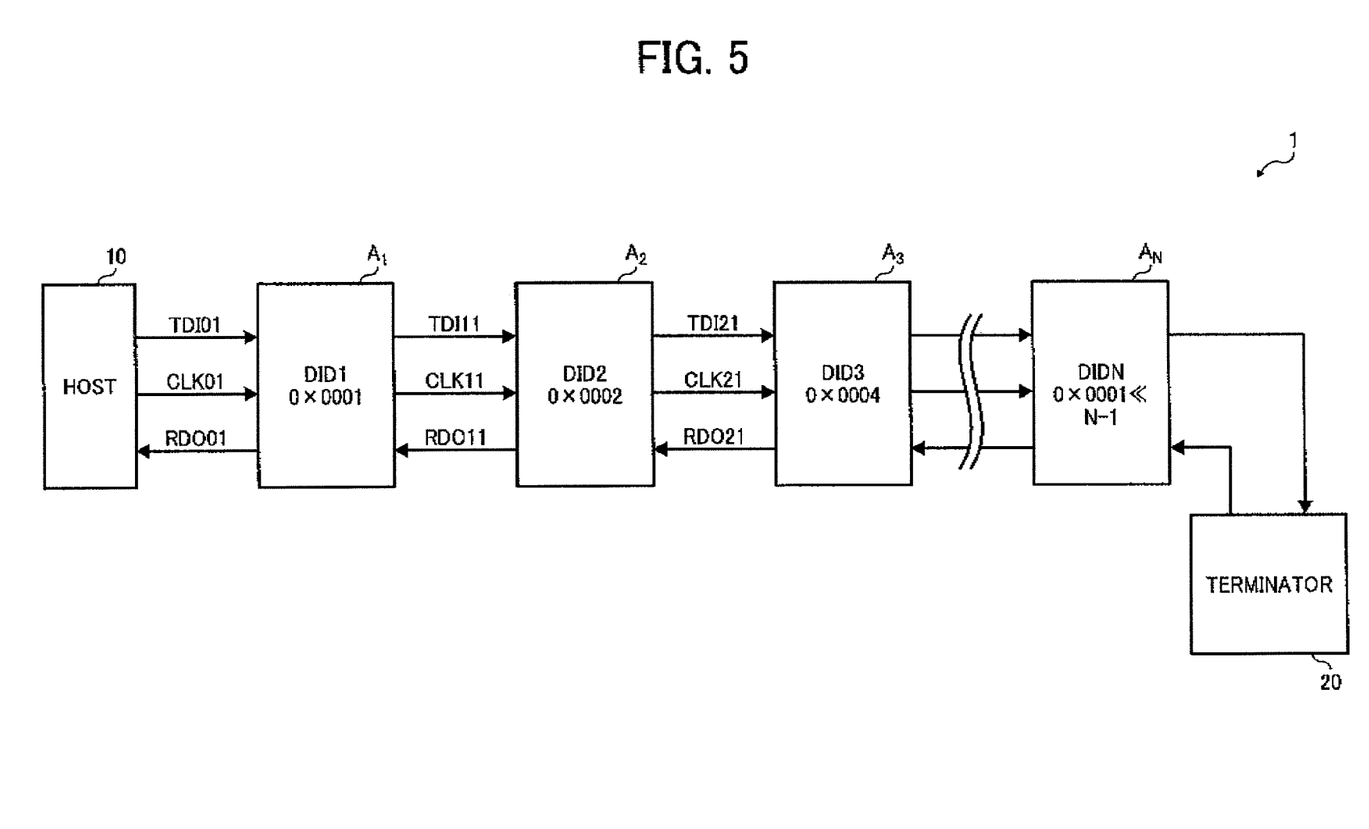
FIG. 5 is a schematic diagram illustrating the communications system according to this patent specification, having first through N-th communications devices connected in series to form a daisy chain network each generating a 16-bit identifier represented as a hexadecimal value.

FIG. 5 is a schematic diagram illustrating the communications system 1 according to this patent specification, having the first through N-th devices $A_1$ through $A_N$, with "N" being an integer not exceeding 16, connected in series to form a daisy chain network each generating a 16-bit identifier represented as a hexadecimal value.

As shown in FIG. 5, the first device $A_1$ extracts 16-bit data "0x0001" from an ID setup request TDI01 submitted by the host computer 10 to set up a decimal identifier number $I_1$ of 1 by decoding the 16-bit data. The first device $A_1$ modifies the ID setup request TDI01 by shifting the 16-bit data left by one bit so that the resulting 16-bit "0x0002" represents a value twice that represented by the original bits, and transmits a modified request TDI11 to the second device $A_2$.

Similarly, the second device $A_2$ extracts 16-bit data "0x0002" from the secondary ID setup request TDI11, decodes it to set up a decimal identifier number $I_2$ of 2, and transmits a modified request TDI21 to the third device $A_3$, which in turn extracts 16-bit data "0x0004" from the tertiary ID setup request TDI21 to set up a decimal identifier number $I_3$ of 3. A similar process is performed in all the subsequent communications devices, resulting in the multiple devices $A_1$ through $A_N$ each having a unique decimal identifier I incremented by one from that assigned to the preceding device.

Figure 6:
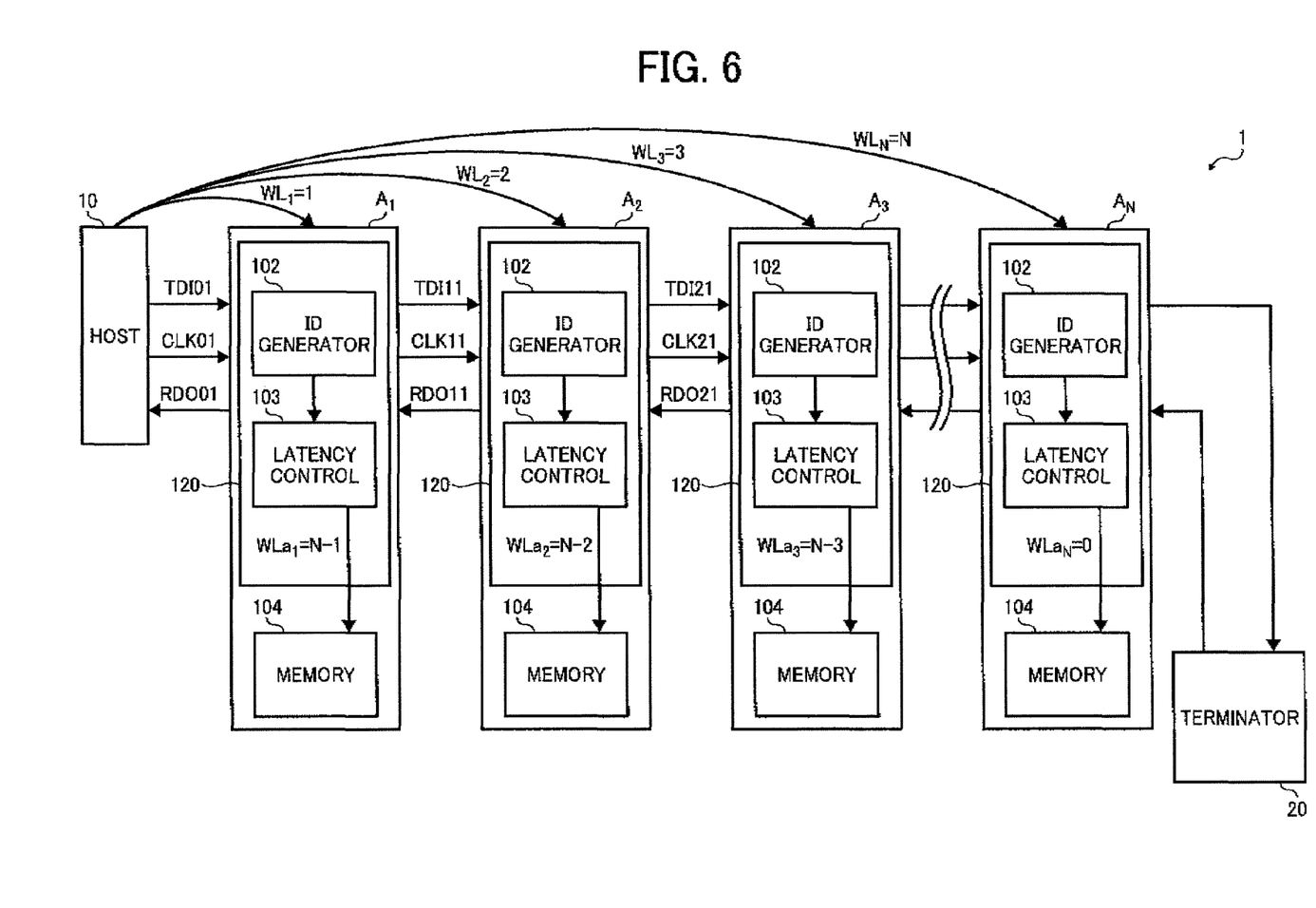
FIG. 6 is a schematic diagram illustrating the communications system of FIG. 5, with a host computer transmitting data to the first through N-th communications devices.

FIG. 6 is a schematic diagram illustrating the communications system 1 with the host computer 10 transmitting data to the first through N-th communications devices $A_1$ through $A_N$.

As shown in FIG. 6, the multiple devices $A_1$ through $A_N$ each has a particular amount of inherent write latency WL between when the host computer 10 submits a write request and when the transmitted data is actually stored to the memory 104, measured in cycles of the system clock signal CLK. Assuming that each device involves a processing delay of 1 clock cycle in the input stage, the write latency WL is 1 clock cycle for the first device $A_1$, 2 clock cycles for the second device $A_2$, 3 clock cycles for the third device $A_3$, and N clock cycles for the N-th device $A_N$.

In this embodiment, each communications device A has the ID generator 102 generating an identifier number I incremented by one from that assigned to the preceding device, and the latency controller 103 calculates an additional write or input latency WLa by subtracting the identifier number I from the total number N of the communications devices A (i.e., WLa=N−I). Thus, with the assigned identifier number I being "1" for the first device $A_1$, "2" for the second device $A_2$, "3" for the third device $A_3$, and "N" for the last device $A_N$, the additional write latency WLa is N−1 cycles for the first device $A_1$, N−2 cycles for the second device $A_2$, N−3 cycles for the third device $A_3$, and 0 for the last device $A_N$.

Figure 7:
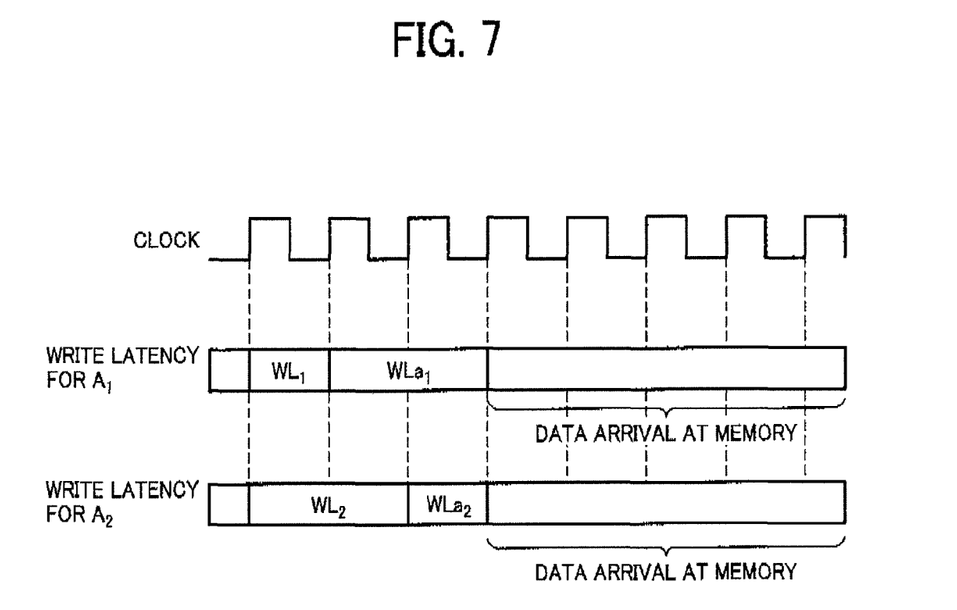
FIG. 7 is a diagram schematically illustrating a total write latency for the first and second devices in the communications system of FIG. 6.

When added to the inherent latency WL, such an additional latency WLa gives a total write latency of N clock cycles common to all the communications devices A present in the daisy chain network. For example, given that the communications system 1 has a total of three communications devices $A_1$ through $A_3$ in the daisy chain, adding the additional latency WLa to the inherent latency WL gives a total write latency of 3 clock cycles for both the first and second devices $A_1$ and $A_2$, as shown in FIG. 7.

Figure 8:
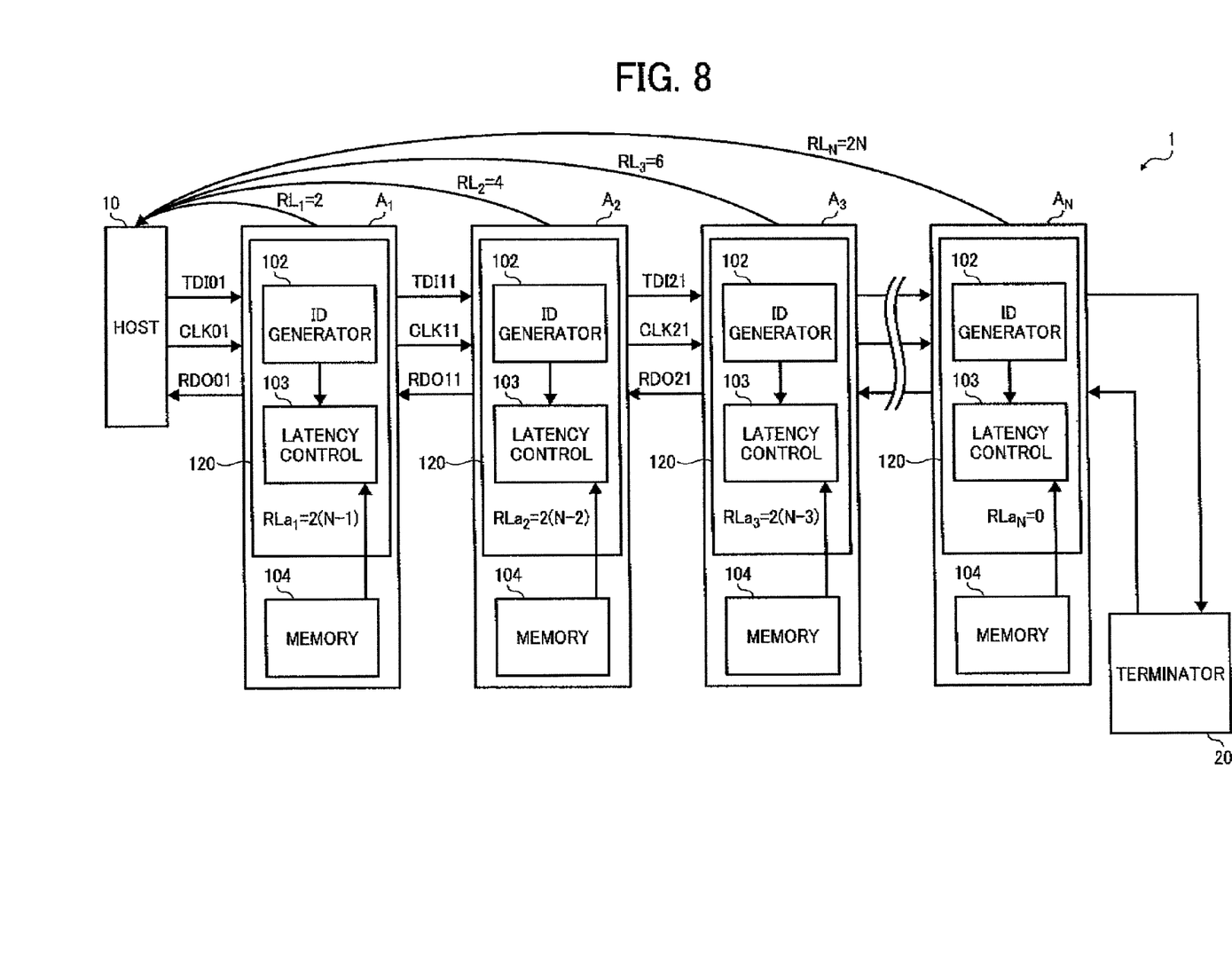
FIG. 8 is a schematic diagram illustrating the communications system of FIG. 5, with a host computer receiving data from the first through N-th communications devices.

FIG. 8 is a schematic diagram illustrating the communications system 1 with the host computer 10 receiving data from the first through N-th communications devices $A_1$ through $A_N$.

As shown in FIG. 8, the multiple devices $A_1$ through $A_N$ each has a particular amount of inherent read latency RL between when desired data is retrieved from the memory 104 and when the retrieved data actually arrives at the host computer 10, measured in cycles of the system clock signal CLK. Assuming that each device involves a processing delay of 2 clock cycles in the output stage (i.e., performing 2-cycle transfer resulting in the delay twice that of the input stage described in FIG. 6), the read latency RL is 2 clock cycles for the first device $A_1$, 4 clock cycles for the second device $A_2$, 6 clock cycles for the third device $A_3$, and 2N clock cycles for the N-th device $A_N$.

In this embodiment, each communications device A has the ID generator 102 generating an identifier number I incremented by one from that assigned to the preceding device, and the latency controller 103 calculates an additional read or output latency RLa by subtracting the identifier number I from the total number N of the communications devices A and multiplying the difference by a factor of 2 (i.e., RLa=2(N−I)). Thus, with the assigned identifier number I being "1" for the first device $A_1$, "2" for the second device $A_2$, "3" for the third device $A_3$, and "N" for the last device $A_N$, the additional write latency RLa is 2(N−1) cycles for the first device $A_1$, 2(N−2) cycles for the second device $A_2$, 2(N−3) cycles for the third device $A_3$, and 0 for the last device $A_N$.

Figure 9:
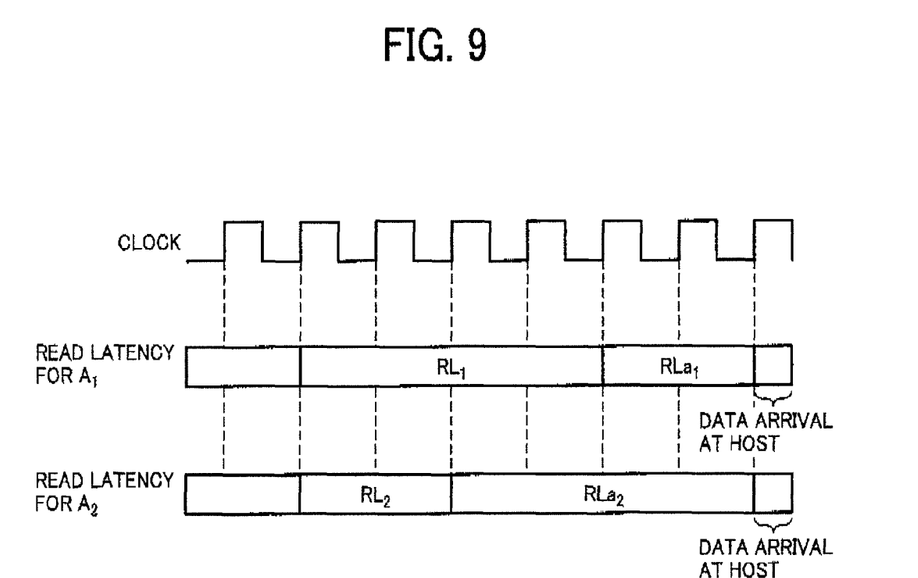
FIG. 9 is a diagram schematically illustrating a total read latency for the first and second devices in the communications system of FIG. 8.

When added to the inherent latency RL, such an additional latency RLa gives a total read latency of 2N clock cycles common to all the communications devices A present in the daisy chain network. For example, given that the communications system 1 has a total of three communications devices $A_1$ through $A_3$ in the daisy chain, adding the additional latency RLa to the inherent latency RL gives a total read latency of 6 clock cycles for both the first and second devices $A_1$ and $A_2$ as shown in FIG. 9.

Thus, the communications devices A according to this patent specification can control the amount of latency with the latency controller 103 according to a unique identifier number assigned thereto in the daisy chain network. The latency controller 103 allows for executing write and read operations sequentially in a regulated number of clock cycles by controlling both the read and write latencies in each of the communications devices A.

Further, the communications devices A according to this patent specification can dynamically generate a unique identifier number with the ID generator 102 decoding and modifying the ID setup signal transmitted through a common data bus, which eliminates the need for providing dedicated paths and/or terminals for assigning identifiers to multiple communications devices.

Furthermore, the communications devices A according to this patent specification enable the host computer 10 to selectively communicate data with multiple CPU cores with the sub-ID register 105 specifying a sub-ID number assigned to each CPU core. This core selectability enables application to data communications with multiprocessors or multi-core processors containing multiple CPU cores.

Still further, the communications system 1 according to this patent specification can adjust the period of total write latency to a uniform value for all the communications devices A in the daisy chain network, in which the latency controller 103 adds a controlled amount of additional write latency to a write latency inherent to each of the communications devices A. Also, the communications system 1 can adjust the period of total read latency to a uniform value for all the communications devices A in the daisy chain network, in which the latency controller 103 adds a controlled amount of additional read latency to a read latency inherent to each of the communications devices A. Preferably, for a daisy chain of N communications devices $A_1$ through $A_N$, such the uniform total latency may be equal to the inherent latency of the N-th (i.e., the last) device $A_N$ farthest from the host computer 10.

Additionally, the communications system according to this patent specification is applicable to a debug system in which multi-processors or single-processors are daisy-chained to a debugging host computer or debugger to perform debugging of the multiple processors.

Numerous additional modifications and variations of the present disclosure are possible in light of the above teachings. For example, although the embodiments described above determine the additional latency in terms of cycles of the system clock CLK output from the host computer 10, the unit of latency may be other than that used in the above embodiments, such as cycles of a clock signal generated by a phase-locked loop (PLL) or a delay-locked loop (DLL) within each communications device A.

Further, although the embodiments above illustrate data transfer to and from the memory and/or the multiple CPU cores within the communications device A, alternatively, the communications system 1 according to this patent specification may be applied where the device A has multiple independent memory devices or registers and/or a variety of functional blocks or circuits each with its own memory holding data to be accessed by the host computer 10.

Furthermore, the number of bits used to construct a serial data signal, and the serial communications protocol according to which the data signal is formatted may be different from those illustrated in the above embodiments.

Still further, the amounts of additional latency as well may be different from those depicted in the embodiments, so long as the latency controller 103 determines the amount of latency based on the identifier number unique to each device A so that all the multiple daisy-chained devices have a uniform amount of total latency in transferring data to or from the internal memory.

It is therefore to be understood that, within the scope of the appended claims, the disclosure of this patent specification may be practiced otherwise than as specifically described herein.

What is claimed as new and desired to be protected by Letters Patent of the United States is:

1. A communications device comprising:
a communications circuit to exchange serial data with a host computer and a downstream device in a daisy chain network, the circuit including:
a first input to receive data from the host computer;
a first output to transmit data to the host computer;
a second input to receive data from the downstream device; and
a second output to transmit data to the downstream device;
a memory accessible through a latency controller in the communications circuit;
an identifier generator to generate an identifier number unique to the communications device in response to an identifier setup request received at the first input; and
wherein the latency controller determines, based on the generated identifier number, a period of additional latency required to access the memory;
wherein the identifier generator further compares the generated identifier number with a reference value held in an identifier register to enable read or write operations to and from the memory through the latency controller.

2. The communications device according to claim 1, wherein the communications circuit reads data from the memory after a determined period of latency has elapsed since receiving a read request at the first input.

3. The communications device according to claim 1, wherein the communications circuit writes data to the memory after a determined period of latency has elapsed since receiving a write request at the first input.

4. The communications device according to claim 1, wherein the identifier generator decodes the identifier setup request to generate the unique identifier number.

5. The communications device according to claim 1, wherein the memory comprises multiple memory nexuses each assigned a unique sub-identifier number, and the communications circuit provides access to each memory nexus by specifying the sub-identifier number.

6. A data communications system comprising:
multiple communications devices connected in series to form a daisy chain network; and
a host computer to communicate data with the multiple communications devices over the daisy chain network,
each communications device including:
a communications circuit to exchange serial data with a host computer and a downstream device, the circuit including:
a first input to receive data from the host computer;
a first output to transmit data to the host computer;
a second input to receive data from the downstream device; and
a second output to transmit data to the downstream device;
a memory accessible through a latency controller in the communications circuit;
an identifier generator to generate an identifier number unique to the communications device in response to an identifier setup request received at the first input; and
wherein the latency controller determines, based on the generated identifier number, a period of additional latency required to access the memory;
wherein the identifier generator further compares the generated identifier number with a reference value held in an identifier register to enable read or write operations to and from the memory through the latency controller.

7. The communications system according to claim 6, wherein the communications circuit reads data from the memory after a determined period of latency has elapsed since receiving a read request at the first input.

8. The communications system according to claim 6, wherein the communications circuit writes data to the memory after a determined period of latency has elapsed since receiving a write request at the first input.

9. The communications system according to claim 6, wherein the period of latency is identical for all the communications devices in the daisy chain network.

10. A method for data communications between a host computer and multiple communications devices,
each communications device including:
a communications circuit to exchange serial data with the host computer and a downstream device in a daisy chain network, the circuit including:
a first input to receive data from the host computer;
a first output to transmit data to the host computer;
a second input to receive data from the downstream device;
a second output to transmit data to the downstream device; and
a memory accessible through a latency controller in the communications circuit,
the method comprising:
providing an identifier setup request to the first input of each communications device;
generating a identifier number unique to each communications device from the identifier setup request;
comparing the generated identifier number with a reference value to enable read or write operations to and from the memory through the latency controller; and
determining, based on the generated identifier number, a period of additional latency required to access the memory through the latency controller.

11. The data communications method according to claim 10, further comprising reading data from the memory through the communications circuit after a determined period of latency has elapsed since receiving a read request at the first input.

12. The data communications method according to claim 10, further comprising writing data to the memory through the communications circuit after a determined period of latency has elapsed since receiving a write request at the first input.

13. The data communications method according to claim 10, wherein identifier generation decodes the identifier setup request to generate the unique identifier number.

14. The data communications method according to claim 10, wherein the memory comprises multiple memory nexuses each assigned a unique sub-identifier number, and the communications circuit provides access to each memory nexus by specifying the sub-identifier number.

15. The communications device according to claim 1, wherein the unique identifier is a decimal identifier is a decimal identifier incremented from that assigned to a preceding device or a first decimal identifier if the communications circuit is directly connected to the host computer.

16. The communications system according to claim 6, wherein the unique identifier is a decimal identifier is a decimal identifier incremented from that assigned to a preceding device or a first decimal identifier if the communications circuit is directly connected to the host computer.

17. The data communications method according to claim 10, wherein the unique identifier is a decimal identifier is a decimal identifier incremented from that assigned to a preceding device or a first decimal identifier if the communications circuit is directly connected to the host computer.

18. The communications device according to claim 15, wherein the additional latency is calculated by subtracting the unique identifier from a total number of communication devices in the daisy chain network and multiplying the difference by a factor of two.

19. The communications system according to claim 16, wherein the additional latency is calculated by subtracting the unique identifier from a total number of communication devices in the daisy chain network and multiplying the difference by a factor of two.

20. The data communications method according to claim 17, wherein the additional latency is calculated by subtracting the unique identifier from a total number of communication devices in the daisy chain network and multiplying the difference by a factor of two.

* * * * *